United States Patent
Foroughi et al.

(10) Patent No.: US 10,657,393 B2
(45) Date of Patent: May 19, 2020

(54) DEVICE AND A METHOD FOR DISTINGUISHING BETWEEN TRAVERSABLE AND NONTRAVERSABLE OBJECTS

(71) Applicant: APTIV TECHNOLOGIES LIMITED, St. Michael (BB)

(72) Inventors: Maryam Foroughi, Wuppertal (DE); Uri Iurgel, Wuppertal (DE); Alexander Ioffe, Bonn (DE)

(73) Assignee: Aptiv Technologies Limited (BB)

( * ) Notice: Subject to any disclaimer, the term of this patent is extended or adjusted under 35 U.S.C. 154(b) by 62 days.

(21) Appl. No.: 16/106,510

(22) Filed: Aug. 21, 2018

(65) Prior Publication Data

US 2019/0087667 A1  Mar. 21, 2019

(30) Foreign Application Priority Data

Sep. 20, 2017 (EP) ..................................... 17192173

(51) Int. Cl.
*G06K 9/00* (2006.01)
*G01S 5/02* (2010.01)
(Continued)

(52) U.S. Cl.
CPC ........ *G06K 9/00805* (2013.01); *G01S 5/0294* (2013.01); *G01S 13/931* (2013.01); *G06N 20/00* (2019.01)

(58) Field of Classification Search
CPC ........... G06K 9/00805; G06K 9/00798; G06K 9/00791; G06K 9/00825; G06K 9/3233
See application file for complete search history.

(56) References Cited

U.S. PATENT DOCUMENTS 6,295,367 B1 * 9/2001 Crabtree ............... G01S 3/7865
382/103
7,609,172 B2 * 10/2009 Rozum ............ G08G 1/096716
340/901
(Continued)

FOREIGN PATENT DOCUMENTS

DE  10 2009 007395 A1  10/2009
DE  10 2011 113016 A1  3/2012
(Continued)

OTHER PUBLICATIONS

Grabe B et al: "Evidence based evaluation method for grid-based environmental representation", Jul. 6, 2009, pp. 1234-1240.
(Continued)

*Primary Examiner* — Yosef Kassa
(74) *Attorney, Agent, or Firm* — Joseph V. Bonadies

(57) ABSTRACT

A device for distinguishing between traversable and non-traversable objects. The device includes: an object-detection sensor unit configured generate data about a space around the sensor, a map generation unit configured to use the data to generate an occupancy grid map and a free space grid map for the space around the object-detection sensor unit. Each of the occupancy grid map and the free space grid map includes an array of cells. Each cell of the occupancy grid map contains an occupied space probability value representing the probability for the respective cell being occupied and each cell of the free grid map contains a free space probability value representing the probability for the respective cell being free. The device includes a classifier unit configured to classify at least one of the cells as containing a traversable or non-traversable object by calculating a difference of two free space probability values derived from the free space probability values of at least two of the cells adjacent to the at least one cell and by using the difference (Continued)

as well as the occupied space probability value of the at least one cell to classify the at least one cell.

15 Claims, 4 Drawing Sheets

(51) Int. Cl.
*G06N 20/00* (2019.01)
*G01S 13/931* (2020.01)

(56) References Cited

U.S. PATENT DOCUMENTS

| | | | | |
|---|---|---|---|---|
| 8,041,079 B2* | 10/2011 | Chiu | ............... | G06T 7/97 |
| | | | | 382/103 |
| 8,144,033 B2* | 3/2012 | Chinomi | ............... | B60R 1/00 |
| | | | | 340/434 |
| 8,321,066 B2 | 11/2012 | Becker et al. | | |
| 8,964,034 B2* | 2/2015 | Nagamine | ............... | B60R 1/00 |
| | | | | 348/148 |
| 8,995,723 B2* | 3/2015 | Stein | ............... | G06K 9/00818 |
| | | | | 382/103 |
| 9,126,045 B2* | 9/2015 | Shome | ............... | A61N 1/36139 |
| 2018/0050694 A1 | 2/2018 | Schroeder et al. | | |

FOREIGN PATENT DOCUMENTS

| | | |
|---|---|---|
| DE | 10 2015 205048 A1 | 9/2016 |
| EP | 2 113 437 A2 | 11/2009 |

OTHER PUBLICATIONS

Seeger Christoph et al: "2-D Evidential Grid Mapping with Narrow Vertical Field of View Sensors Using Multiple Hypotheses and Spatial Neighborhoods", Sep. 15, 2015, pp. 1843-1848.

* cited by examiner

| 238 | 251 | 220 | → average 236
|-----|-----|-----|
| 211 | 200 | 212 |
| 200 | 230 | 205 |

| 238 | 251 | 220 | → average 227
|-----|-----|-----|
| 211 | 200 | 212 |
| 200 | 230 | 205 |

| 238 | 251 | 220 | → average 212
|-----|-----|-----|
| 211 | 200 | 212 |
| 200 | 230 | 205 |

| 238 | 251 | 220 |
|-----|-----|-----|
| 211 | 200 | 212 |
| 200 | 230 | 205 | → average 215

| 238 | 251 | 220 |
|-----|-----|-----|
| 211 | 200 | 212 |
| 200 | 230 | 205 | → average 211

| 238 | 251 | 220 |
|-----|-----|-----|
| 211 | 200 | 212 |
| 200 | 230 | 205 | → average 213

| 238 | 251 | 220 | → average 216
|-----|-----|-----|
| 211 | 200 | 212 |
| 200 | 230 | 205 |

| 238 | 251 | 220 | → average 233
|-----|-----|-----|
| 211 | 200 | 212 |
| 200 | 230 | 205 |

FIG. 7

DEVICE AND A METHOD FOR DISTINGUISHING BETWEEN TRAVERSABLE AND NONTRAVERSABLE OBJECTS

TECHNICAL FIELD OF INVENTION

The invention concerns a device and a method for distinguishing between traversable and non-traversable objects.

BACKGROUND OF INVENTION

In recent decades advanced driver assistance systems (ADAS) have been developed to help and assist drivers and prevent accidents. ADAS provide a more comfortable and safer driving experience by supporting human awareness and actions with exact machine tasks and warnings. These reduce significantly the amount of accidents caused by driver errors.

ADAS are usually based on proximity sensors, e.g., radar, laser and/or ultrasound, camera systems, global positioning systems (GPS), car-to-car and car-to-infrastructure systems. Proximity sensors are used to develop systems such as adaptive cruise control (ACC), automatic parking, lane change assistance, blind spot detection (BSD) systems, emergency brake assist (EBA), etc. A precise world model is among the essential requirements of a successful implementation of the ADAS, which would significantly reduce the complication of tasks such as navigation, path planning, and obstacle avoidance.

Distinction of traversable and non-traversable objects is an important topic of the ADAS. It provides important information as to where a vehicle can drive under special conditions. For example, a curb is a traversable obstacle which is seen by a radar, but does not necessary limit the drivable area as, for example, the vehicle can cross the curb to park on a sidewalk. If one interprets any radar detections directly as non-traversable obstacles, this would yield wrong understanding of the environment.

Usually, to distinguish between traversable and non-traversable obstacles, one needs height information. Automotive radars without special elevation measurement function (two-dimensional or 2D radars) do not provide height information, and three-dimensional or 3D radars with full resolution of vertical angle are still expensive.

SUMMARY OF THE INVENTION

In one aspect of the invention a device for distinguishing between traversable and non-traversable objects is provided. The device comprises an object-detection sensor unit, a map generation unit and a classifier unit.

The object-detection sensor unit is configured to monitor a space around the object-detection sensor unit and to generate data about the space. The data provided by the object-detection sensor unit can be used to detect objects (or obstacles) in the vicinity of the object-detection sensor unit. Further, the object-detection sensor unit may be mountable on a vehicle to detect objects (or obstacles) in the vicinity of the vehicle.

The map generation unit is configured to use the data generated by the object-detection sensor unit in order to generate an occupancy grid map and a free space grid map for the space around the object-detection sensor unit. Each of the occupancy grid map and the free space grid map comprises an array of cells. In particular, the occupancy grid map and the free space grid map comprise the same array of cells. Further, each cell of the occupancy grid map contains an occupied space probability value that represents the probability for the respective cell being occupied. Each cell of the free grid map contains a free space probability value that represents the probability for the respective cell being free, i.e., empty.

The classifier unit is configured to classify at least one of the cells. As a result of the classification of the at least one cell the classifier can predict that the at least one cell contains a traversable object or a non-traversable object in the real world. Thus, the classifier classifies the at least one cell as traversable or non-traversable. For the classification of the at least one cell the classifier unit uses the free space probability values of at least two of the cells adjacent to the at least one cell. The classifier unit calculates the difference of two free space probability values derived from the free space probability values of these at least two cells, which are neighbor cells of the at least one cell. The difference calculated by the classifier unit and the occupied space probability value of the at least one cell is used to predict whether the at least one cell contains a traversable object or a non-traversable object in the real world, thereby classifying the at least one cell.

In one embodiment, the two free space probability values used for calculating the difference are the free space probability values of two cells, which are neighbor cells of the at least one cell. In a further embodiment, the two free space probability values used for calculating the difference are derived from the free space probability values of the cells surrounding the at least one cell by calculating average values of the free space probability values of the cells surrounding the at least one cell. Two extreme values of the average values, in particular the highest average value and the lowest average value, are used to calculate the difference of the two extreme values. In other words, the two extreme values are the two free space probability values derived from the free space probability values of the at least two cells in this embodiment.

The classifier unit thus uses two representations of the environment, created from the detections of the object-detection sensor unit: the occupancy grid map and the free space grid map. Both maps are used to classify the traversable and non-traversable objects. This distinguishes the device from the other currently used methods and devices: most other approaches, in particular Bayesian approaches, use a single grid map that is intended to identify both free space and occupancy information. According to the present invention, this information is not integrated into one single map, thus delivering more information which is important for the classification of traversable/non-traversable objects. In other words, the probability of free or empty space in the free space grid map and the probability of occupied space in the occupancy grid map are not complementary.

It is an advantage of the device according to the invention that the device can distinguish between traversable and non-traversable objects without the need of height information regarding the objects.

In one embodiment, a plurality of groups is pre-determined, wherein each group contains a plurality of cells. All cells of the groups are adjacent to the at least one cell, i.e., the cells contained in the groups are neighbor cells of the at least one cell. Further, the cells of each group are located adjacent to each other, i.e., the cells of each group are consecutive cells. The classifier unit is configured to calculate for each group the average value of the free space probability values of the cells contained in the respective group. In addition, the classifier unit determines the highest average value and the lowest average value among the average values of the plurality of groups. The difference of the two free space probability values, which is calculated by the classifier unit and is used for the classification of the at least one cell, is the difference between the highest average value and the lowest average value in this embodiment.

In addition, the aforementioned embodiment may provide that each group contains a pre-determined number of cells. Each group may contain the same number of cells, for example, three cells or more than three cells. Further, each group contains different cells, which means that two groups differ in at least one cell. Further, the number of the groups is equal to the number of cells located adjacent to the at least one cell. For example, if the cells have a rectangular shape, each cell of the array is surrounded by eight cells and has thus eight neighbor cells. In this case, the number of the groups is eight.

The object-detection sensor unit may comprise a radar unit, in particular a 2D radar unit that is not able to provide height information of objects.

The classifier unit may further be configured to classify each of a plurality of the cells as containing a traversable or non-traversable object in the same fashion as explained above. In particular, before calculating the difference of the two free space probability values derived from the free space probability values of the at least two cells adjacent to a respective cell the classifier unit may check whether the occupied space probability value of the respective cell is equal to or greater than a pre-determined value. The classifier unit may only calculate the difference of the two free space probability values if the occupied space probability value of the respective cell is equal to or greater than the pre-determined value. Thus, the classifier may only classify those cells, the occupied space probability value of which is equal to or greater than the pre-determined value.

The classifier unit may comprise a classifier model. A feature vector may be generated which is input into the classifier model for each cell that shall be classified. The feature vector may contain a first feature and a second feature. The first feature for a respective cell may be derived from the occupied space probability value of the respective cell. The second feature for the respective cell may be the difference of the two free space probability values derived from the free space probability values of the at least two cells adjacent to the respective cell. The classifier model uses the feature vector to classify the respective cell. The classifier model can classify the respective cell as containing a traversable or non-traversable object.

A machine learning algorithm may be used to establish the classifier model.

According to a further aspect of the invention, a vehicle comprises the device for distinguishing between traversable and non-traversable objects as explained above. In this case, the object-detection sensor unit, in particular the radar unit, is mounted on the vehicle in order to monitor the space around the vehicle.

According to yet a further aspect of the invention, a method for distinguishing between traversable and non-traversable objects comprises the following steps. An object-detection sensor unit, in particular a 2D radar unit, is used to monitor a space around the object-detection sensor unit and to generate data about the space. By means of the data generated by the object-detection sensor unit, an occupancy grid map and a free space grid map are generated for the space around the object-detection sensor unit. Each of the occupancy grid map and the free space grid map comprises an array of cells. Each cell of the occupancy grid map contains an occupied space probability value representing the probability for the respective cell being occupied, and each cell of the free grid map contains a free space probability value representing the probability for the respective cell being free. At least one of the cells is classified as containing a traversable or non-traversable object by calculating a difference of two free space probability values derived from the free space probability values of at least two of the cells adjacent to the at least one cell and by using the difference as well as the occupied space probability value of the at least one cell in order to classify the at least one cell.

The method may comprise the embodiments disclosed above in connection with the device for distinguishing between traversable and non-traversable objects.

Further features and advantages will appear more clearly on a reading of the following detailed description of the preferred embodiment, which is given by way of non-limiting example only and with reference to the accompanying drawings.

BRIEF DESCRIPTION OF DRAWINGS

The invention will be described in more detail in the following in an exemplary manner with reference to an embodiment and to the drawings. There are shown in these:

FIG. 7 is a schematic representation of extracting a feature from the free space grid map.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
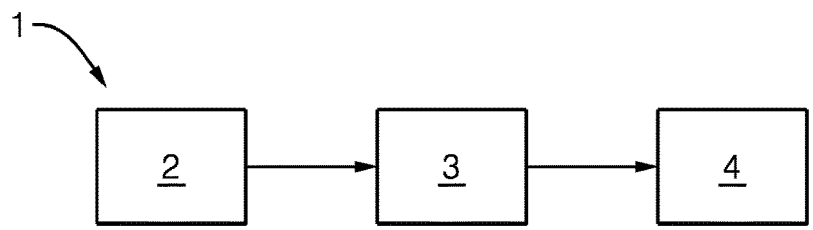
FIG. 1 is a schematic representation of a device for distinguishing between traversable and non-traversable objects.

FIG. 1 illustrates a device 1 that allows distinguishing between traversable and non-traversable objects. The device 1 includes an object-detection sensor unit 2, a map generation unit 3 and a classifier unit 4. The object-detection sensor unit 2 is mounted on a vehicle, for example a car, and monitors the space around the vehicle, i.e., the environment of the vehicle. Further, the object-detection sensor unit 2 records data about the space around the vehicle. Objects (or obstacles) that are located around the vehicle can be detected from the data generated by the objection-detection sensor unit 2.

In the present embodiment, the object-detection sensor unit 2 includes a 2D radar unit that does not have elevation measurement.

The object-detection sensor unit 2 provides the map generation unit 3 with the recorded data about the space around the vehicle. The map generation unit 3 uses the data recorded by the object-detection sensor unit 2 in order to generate an occupancy grid map and a free space grid map for the space around the vehicle. Each of the occupancy grid map and the free space grid map comprises the same array of cells, wherein each cell of the occupancy grid map contains an occupied space probability value that represents the probability for the respective cell being occupied and each cell of the free grid map contains a free space probability value that represents the probability for the respective cell being free.

The map generation unit 3 provides the classifier unit 4 with the occupancy grid map and the free space grid map. The classifier unit 4 classifies a plurality of cells as containing a traversable or non-traversable object in the real world. For this purpose, the classifier unit 4 calculates for each cell to be classified the difference of two free space probability values derived from the free space probability values of at least two of the cells adjacent to the respective cell. The classifier unit 4 uses the calculated difference and the occupied space probability value of the respective cell in order to classify the at least one cell.

Figure 2A:
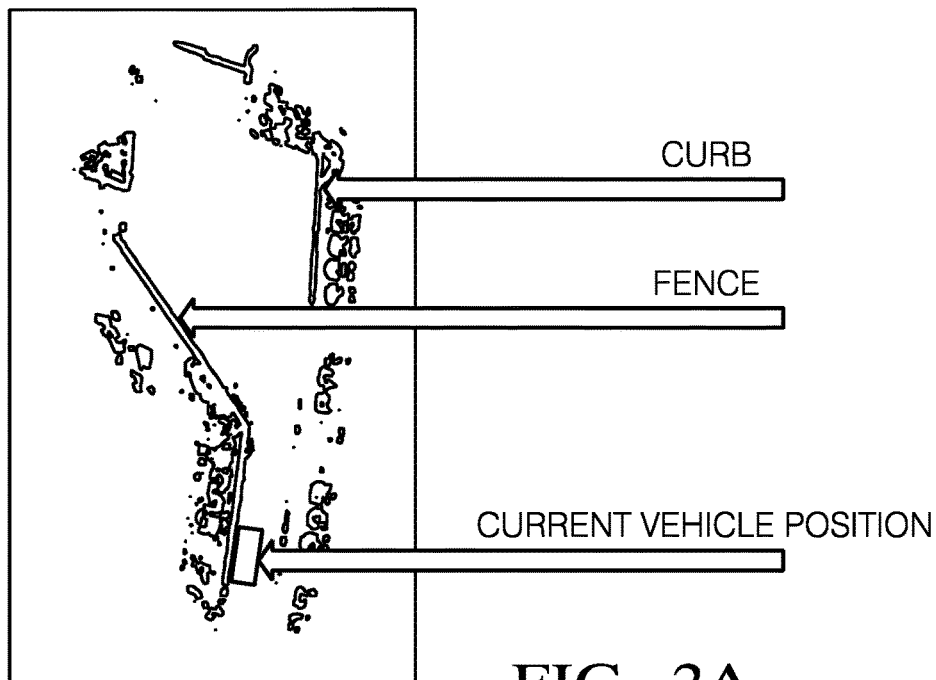
FIG. 2A is an example of an occupancy grid map.
Figure 2B:
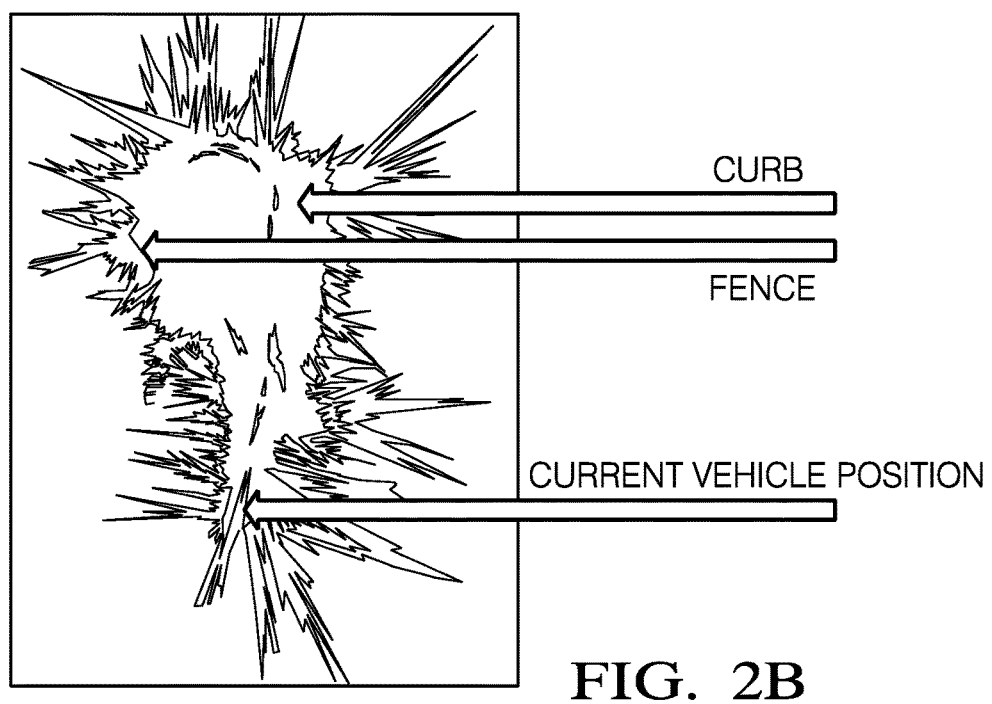
FIG. 2B is an example of a free space grid map.

FIG. 2A shows an example of an occupancy grid map and FIG. 2B shows an example of a free space grid map. Both maps are generated from data recorded by the object-detection sensor unit 2 at the same location, thus both maps show the same environment of the vehicle.

The occupancy grid map and the free space grid map are two representations of the real world environment. Both maps represent occupied and empty spaces in any given environment.

The occupancy grid map is an array of cells representing a certain area within the real world. Each cell of the occupancy grid map contains an occupied space probability value for each area in the real world being occupied. Similarly, the free space grid map is an array of cells representing a certain area within the real world. Each cell of the free space grid map contains a free space probability value for each area in the real world being free, i.e., empty. The occupation probability for any space in the occupancy grid map is visualized by the darkness intensity as shown in FIG. 2A. In other words, the higher the probability of a given point to be occupied, the darker that point would be on the occupancy grid map. Similarly, the probability of "free" space in the free space grid map is visualized by the brightness intensity as shown in FIG. 2B, i.e., the higher the probability of a given point to be free, the brighter or lighter that point would be in the free space grid map.

In the example of FIGS. 2A and 2B, in the environment around the vehicle there are two different obstacles: a curb and a fence, which are considered as a traversable object and a non-traversable object, respectively. Comparing both obstacles, one will realize that the occupied space probability value of the fence is greater than the occupied space probability value of the curb. Furthermore, fences cases more cells of the occupancy grid map to have occupied space probability values higher than the default or initialized value. Referring to the free space grid map, one can realize that the free space probability values behind the fence are very low, while the free space probability values on both sides of the curb are about equal.

Figure 3:
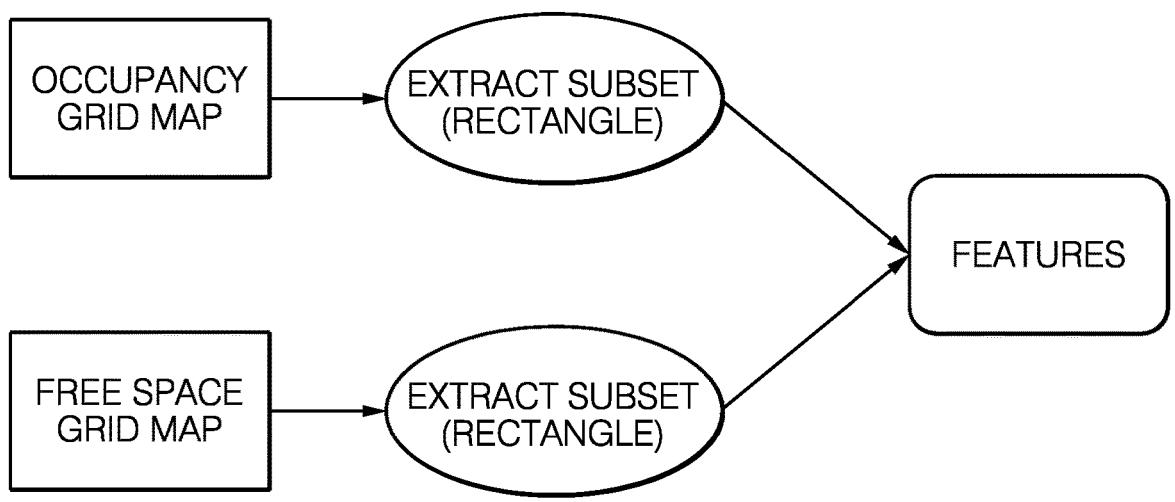
FIG. 3 is a schematic representation of extracting features from the occupancy grid map and the free space grid map.

To distinguish the traversable and non-traversable objects feature vectors are defined based on the information from the occupancy grid map and the free space grid map generated from 2D radar detections of the object-detection sensor unit 2 as schematically shown in FIG. 3. Respective features are derived from the occupancy grid map and the free space grid map separately, due to the fact that occupied and free probability of the radar maps generally do not build a unit, especially for transparent objects like curbs. The features are specifically and carefully selected to best suit for the problem to maximize the performance.

Figure 4:
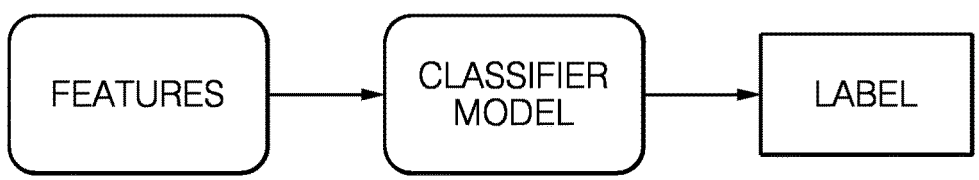
FIG. 4 is a schematic representation of the function of the classifier model.

Any machine learning algorithm can be used to characterize the objects. In the present embodiment, the classification is carried out by the classifier unit 4 using a SVM (support vector machine) classifier with a linear kernel. As schematically shown in FIG. 4, the features extracted from the occupancy grid map and the free space grid map are input into the classifier unit comprising the classifier model. The classifier unit generates labels from the features predicting whether a cell contains a traversable or a non-traversable object.

Figure 5:
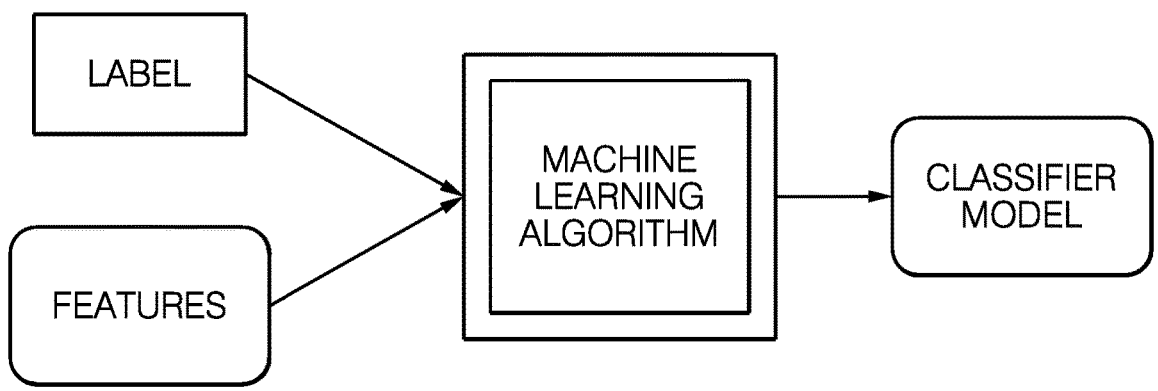
FIG. 5 is a schematic representation of a machine learning model to establish the classifier model.

Before the SVM classifier can be used to distinguish between traversable and non-traversable objects, the SVM classifier must be trained. In the training phase, features extracted from the occupancy grid map and the free space grid map are input into a machine learning algorithm as schematically shown in FIG. 5. In addition, the objects contained in the occupancy grid map and the free space grid map are labelled as traversable or non-traversable, i.e., the machine learning algorithm is informed that curbs and, in particular, similar objects with a specified height are considered as traversable object, whereas fences and walls and, in particular, similar objects are considered as non-traversable objects. From this information the machine learning algorithm generates the classifier model.

To train and test the approach, logs are used and occupancy and free space grid maps are created that contain scenarios with the two types of objects: traversable and non-traversable objects.

In order to train the classifier unit 4, sub-areas of the occupancy and free space grid maps containing curbs and/or fences are manually selected. The width of the selected sections is, for example, about six pixels and their length depends on the length of the curb or the fence.

Figure 6:
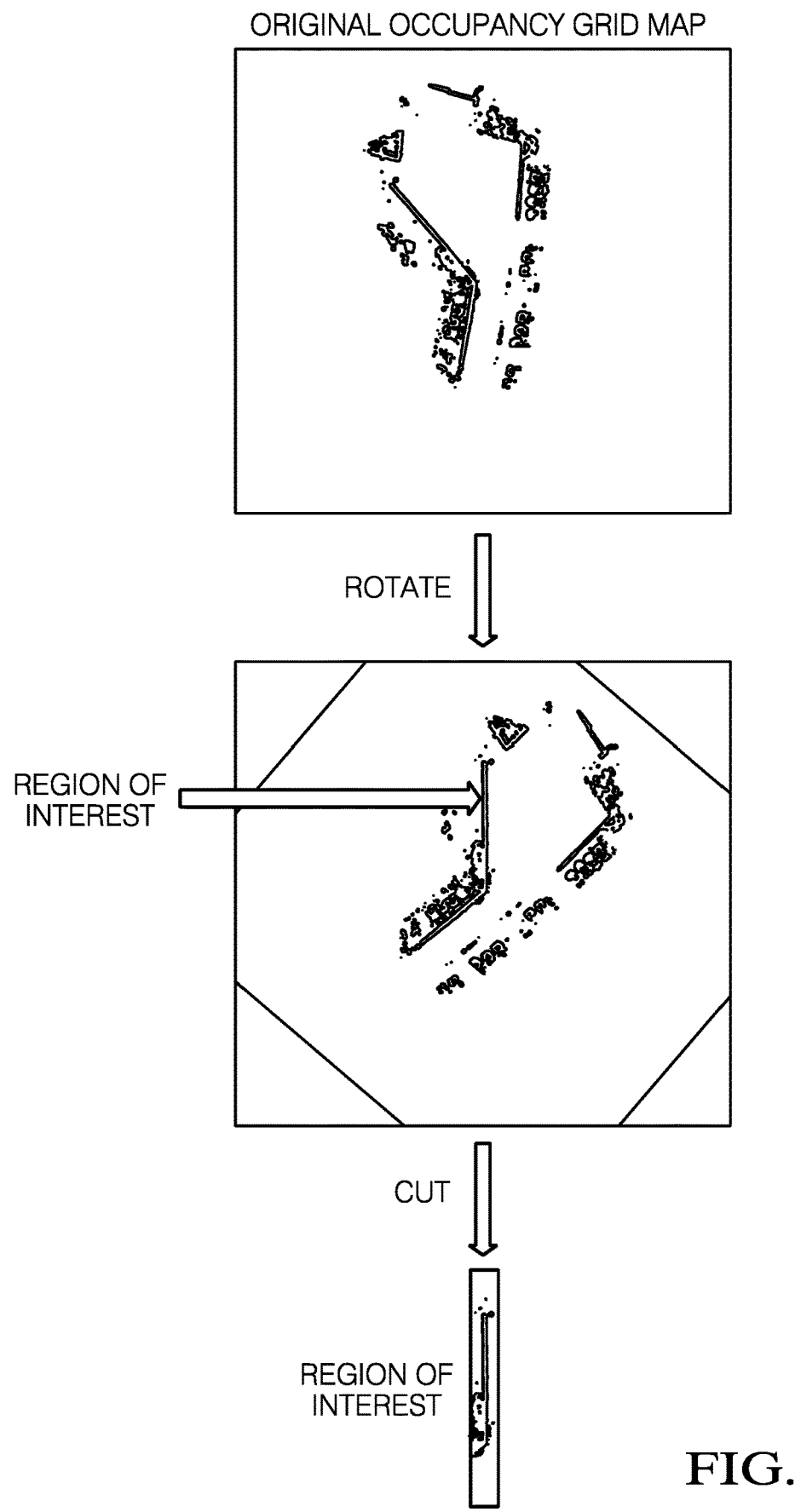
FIG. 6 is a schematic representation of selecting and cutting a region of interest from the occupancy grid map and the free space grid map.

FIG. 6 shows an example how a section can be selected. At the top of FIG. 6 the original occupancy grid map is illustrated. Both the occupancy grid map and the free space grid map are first rotated such that the area of the curb or the fence or any other obstacle is placed on a vertical line or any other pre-defined line. Thus, the regions of interest that shall be selected always have a pre-determined orientation, in particular a vertical orientation, which makes it easier to determine and to cut the regions of interest from the occupancy grid map and the free space grid map. When the regions of interest have been cut from the occupancy grid map and the free space grid map, only these regions are further processed and for each cell position in these regions a feature vector is calculated containing features extracted from the occupancy grid map and the free space grid map as explained in further detail below.

When the training phase is completed and the classifier model has been established, the classifier model can be used by the classifier unit 4 of the device 1 to classify objects detected by the object-detection sensor unit 2. Each cell is classified as traversable or non-traversable. The class "traversable", which contains, for example, curbs, can be defined as positive (+1), and the class "non-traversable", which contains, for example, fences and walls, can be defined as negative (−1).

For the classification feature vectors are generated. Each feature vector for a respective cell contains a first feature component and a second feature component. The first feature is derived from the occupancy grid map. To calculate the first feature component of the final feature vector, the log-odds probability values stored in each cell of the occupancy grid map inside the region of interest may be linearly mapped to a pre-determined range. In the present embodiment, the log-odds probability values stored in the cells of the occupancy grid map are linearly mapped to a range from 0 to 255. This value is used as the first feature.

As there is the difference in height between traversable and non-traversable objects, the probability of free space behind non-traversable objects is generally less than the probability of free space behind traversable objects. In particular, the probabilities of free space on both sides of a curb are similar. This is used to create the second feature for a respective cell.

In order to calculate the second feature for a respective cell the cells adjacent to the respective cell are considered as exemplarily shown in FIG. 7. In this example, the cells have a rectangular shape and thus each cell has eight neighbor cells, which are adjacent to this cell. In the diagrams of FIG. 7 one cell in the center and the eight neighbor cells of this cell are shown. Further, the free space probability value is noted for each of the cells.

The eight neighbor cells of the center cell are considered as follows. First, from three consecutive neighbor cells of the center cell, the average value of the free space probability values of those three cells is calculated. These three cells define one group of cells. This is repeated for all combinations of three consecutive neighbor cells as shown in FIG. 7. In total, there are eight different groups of cells, wherein each group is marked by a dashed line surrounding the cells of the respective group. For each group, the average value of the free space probability values of the three cells of the respective group is calculated. With the assumption that the greatest average value represents the area in front of the object and the smallest average value represents the area behind the object, the difference between the greatest and the smallest average value of the eight average values is calculated. This difference is used as the second feature of the feature vector for the center cell.

In the example shown in FIG. 7, the greatest average value is 236 and the smallest average value is 211. Thus, the difference between the greatest and the smallest average value is 236−211=25. The value 25 is used as the second feature of the feature vector for the center cell.

During the training phase, the same kind of feature vectors is used for the training of the SVM classifier.

Other cells may be classified in the same fashion as explained above. It is to be noted that only cells with a sufficiently large probability of occupancy as noted in the occupancy grid map can contain an obstacle. Therefore, it may be provided that only for the cells, the occupied space probability value of which is equal to or greater than a pre-determined value, a feature vector is created. The created feature vectors are then input into the classifier model to predict the classes of the cells as illustrated in FIG. 4.

The device and method to classify each grid cell, as described above, was evaluated. Using a SVM as classification method, an accuracy of 95.22% is achieved on a training and test set. All evaluation measures can be seen in Table 1.

TABLE 1

| Accuracy (%) | Precision (%) | Recall (%) | F-measure |
|---|---|---|---|
| 95.22 | 94.81 | 96.46 | 95.63 |

We claim:

1. A device (1) for distinguishing between traversable and non-traversable objects, said device (1) comprising:
an object-detection sensor unit (2) configured to monitor a space around the object-detection sensor unit (2) and to generate data about the space,
a map generation unit (3) configured to use the data generated by the object-detection sensor unit (2) in order to generate an occupancy grid map and a free space grid map for the space around the object-detection sensor unit (2), wherein each of the occupancy grid map and the free space grid map comprises an array of cells, each cell of the occupancy grid map contains an occupied space probability value representing the probability for the respective cell being occupied and each cell of the free grid map contains a free space probability value representing the probability for the respective cell being free, and
a classifier unit (4) configured to classify at least one of the cells as containing a traversable or non-traversable object by calculating a difference of two free space probability values derived from the free space probability values of at least two of the cells adjacent to the at least one cell and by using the difference as well as the occupied space probability value of the at least one cell to classify the at least one cell.

2. The device (1) as claimed in claim 1, wherein a plurality of groups of cells that are adjacent to the at least one cell are pre-determined, wherein the cells of each group are located adjacent to each other, wherein the classifier unit (4) is further configured to calculate for each group the average value of the free space probability values of the cells of the respective group and to determine the highest average value and the lowest average value, and wherein the difference of the two free space probability values calculated by the classifier unit (4) is the difference between the highest average value and the lowest average value.

3. The device (1) as claimed in claim 2, wherein each group contains a pre-determined number of cells, wherein each group contains different cells, and wherein the number of the groups is equal to the number of cells located adjacent to the at least one cell.

4. The device (1) as claimed in claim 1, wherein the object-detection sensor unit (2) comprises a radar unit, in particular a 2D radar unit.

5. The device (1) as claimed in claim 1, wherein the classifier unit (4) is further configured to classify a plurality of the cells as containing a traversable or non-traversable object, and wherein the classifier unit (4) is configured to classify only those cells, the occupied space probability value of which is equal to or greater than a pre-determined value.

6. The device (1) as claimed in claim 1, wherein the classifier unit (4) comprises a classifier model, wherein a feature vector is input into the classifier model for each cell and the classifier model uses the feature vector to classify the respective cell as containing a traversable or non-traversable object, wherein the feature vector for a respective cell comprises a first feature and a second feature, and wherein the first feature is derived from the occupied space probability value of the respective cell and the second feature is derived from the difference of the two free space probability values derived from the free space probability values of the at least two cells adjacent to the respective cell.

7. The device (1) as claimed in claim 6, wherein the classifier model is established by a machine learning algorithm.

8. A vehicle comprising the device (1) as claimed in claim 1.

9. A method for distinguishing between traversable and non-traversable objects, said method comprising:
using an object-detection sensor unit (2) to monitor a space around the object-detection sensor unit (2) and to generate data about the space;
generating an occupancy grid map and a free space grid map for the space around the object-detection sensor unit (2) by means of the data generated by the object-detection sensor unit (2), wherein each of the occupancy grid map and the free space grid map comprises an array of cells, each cell of the occupancy grid map contains an occupied space probability value representing the probability for the respective cell being occupied and each cell of the free space grid map contains a free space probability value representing the probability for the respective cell being free; and
classifying at least one of the cells as containing a traversable or non-traversable object by calculating a difference of two free space probability values derived from the free space probability values of at least two of the cells adjacent to the at least one cell and by using the difference as well as the occupied space probability value of the at least one cell to classify the at least one cell.

10. The method as claimed in claim 9, wherein a plurality of groups of cells that are adjacent to the at least one cell is pre-determined, wherein the cells of each group are located adjacent to each other, wherein for each group the average value of the free space probability values of the cells of the respective group is calculated and the highest average value and the lowest average value are determined, and wherein the calculated difference of the two free space probability values is the difference between the highest average value and the lowest average value.

11. The method as claimed in claim 10, wherein each group contains a pre-determined number of cells, wherein each group contains different cells, and wherein the number of the groups is equal to the number of cells located adjacent to the at least one cell.

12. The method as claimed in claim 9, wherein the object-detection sensor unit (2) comprises a 2D radar unit.

13. The method as claimed in claim 9, wherein a plurality of the cells is classified as containing a traversable or non-traversable object, and wherein in particular only those cells are classified, the occupied space probability value of which is equal to or greater than a pre-determined value.

14. The method as claimed in claim 9, wherein a classifier model is provided, wherein a feature vector is input into the classifier model for each cell and the classifier model uses the feature vector to classify the respective cell as containing a traversable or non-traversable object, wherein the feature vector for a respective cell comprises a first feature and a second feature, and wherein the first feature is derived from the occupied space probability value of the respective cell and the second feature is derived from the difference of the two free space probability values derived from the free space probability values of the at least two cells adjacent to the respective cell.

15. The method as claimed in claim 14, wherein a machine learning algorithm is used to establish the classifier model.

* * * * *